Patented Jan. 3, 1950

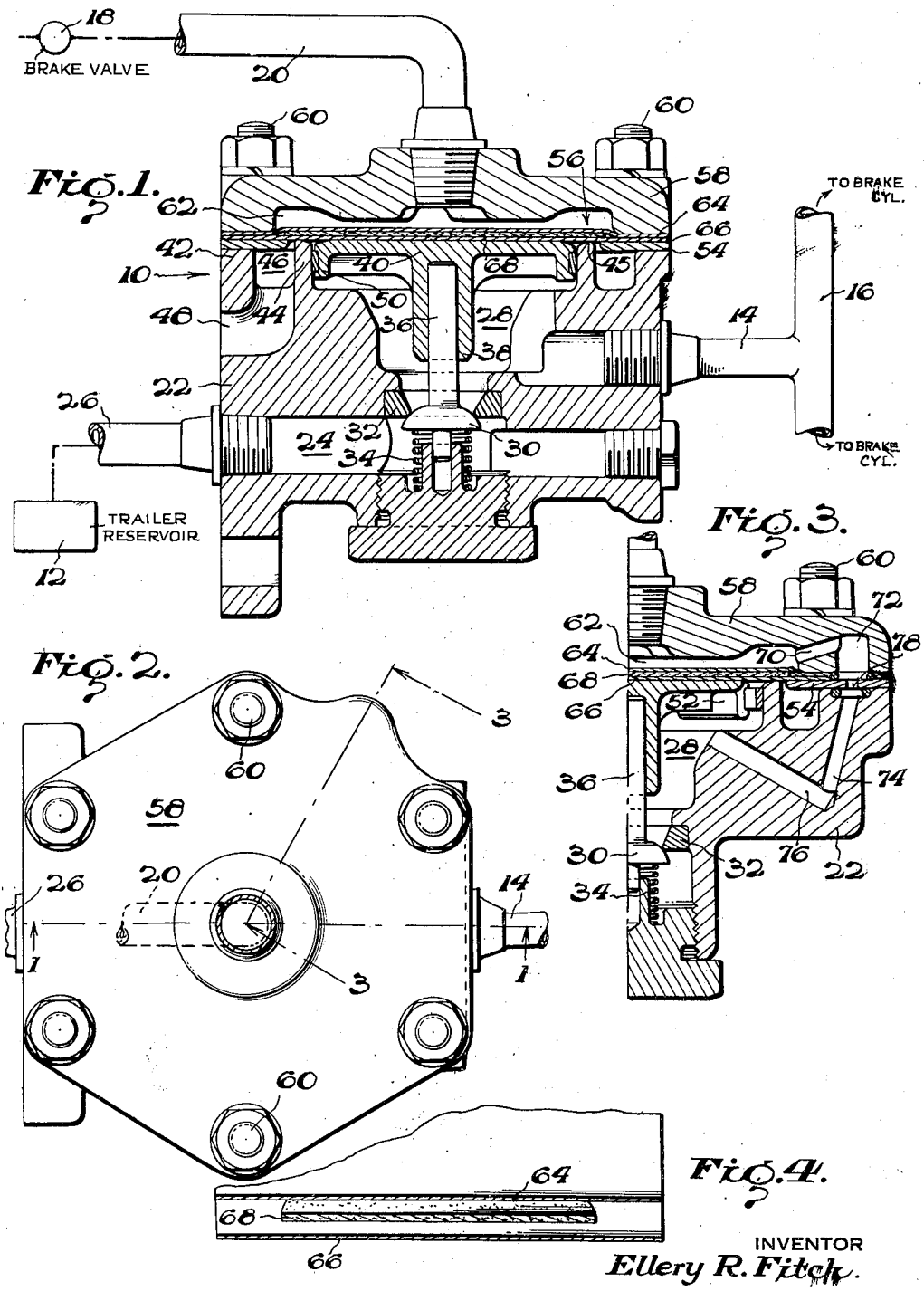

2,493,449

UNITED STATES PATENT OFFICE 2,493,449

FLUID-PRESSURE VALVE

Ellery R. Fitch, Elyria, Ohio, assignor to Bendix-Westinghouse Automotive Air Brake Company, Elyria, Ohio, a corporation of Delaware Application September 18, 1947, Serial No. 774,765

6 Claims. (Cl. 137—139)

This invention relates to a fluid pressure valve construction and more particularly to a relay valve of the self-lapping type which is unusually effective in controlling the application and release of a gaseous pressure medium, such as compressed air.

Fluid pressure relay valves of the general type to which the present invention is directed, have been utilized heretofore in connection with truck and trailer air brake installations in order to obtain substantially simultaneous application of the brakes on both vehicles. For example, a valve of this type is disclosed in the patent to W. A. Eaton et al. No. 2,018,202 dated October 22, 1935, and includes a diaphragm construction which not only controls the operation of the inlet valve, but also functions as an exhaust valve in its cooperation with an annular exhaust valve seat. During operation of valves of the general type shown in the Eaton et al. patent, and especially where the diaphragm was formed of relatively thin flexible material and was secured at its outer periphery to the valve casing, it was found that during exhaust, the vibration of the diaphragm caused a whistle or squeal of considerable volume and carrying power. Such noisy operation of the valve was found to be highly objectionable. The principal object of the present invention is to accordingly provide a relay valve of the foregoing character which entirely eliminates the noisy operation heretofore referred to.

Another object is to improve the operating characteristics and efficiency of operation of a relay valve of the above type.

Still another object is to provide a novel diaphragm construction for a relay valve, which is so constructed and arranged as to secure an increase in exhaust capacity, at a relatively low activating differential and without any accompanying noisy operation.

A further object is to provide in a diaphragm construction for a relay valve of the above type a novel arrangement including a pair of relatively thin, rubber-like diaphragms which are superposed and which carry therebetween a floating disc of friction material such as felt, for example, the construction being such that during operation of diaphragm construction as an exhaust valve, all vibration thereof in the sonic range will be eliminated by reason of the friction developed between the contacting surfaces of the flexible diaphragms and the felt disc.

Other objects and novel features of the invention will appear more fully hereinafter from the following detailed description when taken in connection with the accompanying drawing illustrative of one form of the invention. It is to be expressly understood however, that the drawing is utilized for purposes of illustration only, and is not to be taken as a definition of the limits of the invention, reference being had for this purpose to the appended claims.

In the drawing, wherein similar reference characters refer to similar parts throughout the several views;

Fig. 1 is a vertical sectional view of a relay valve constructed in accordance with the principles of the present invention and taken substantially along the line 1—1 of Fig. 2;

Fig. 2 is a plan view of the relay valve;

Fig. 3 is a partial view in section of a portion of the valve mechanism, taken along line 3—3 of Fig. 2, and Fig. 4 is a fragmentary perspective view partly in section of the superposed elements constituting the novel diaphragm construction.

Referring more particularly to Fig. 1, the present invention is illustrated therein as comprising a relay valve 10 which is adapted to be mounted upon a trailer in order to control the flow of compressed air from a trailer reservoir 12 to a plurality of trailer brake cylinders, not shown, as by means of conduits 14 and 16. The operation of the relay valve 10 is controlled in the usual manner, as by means of a brake valve 18, positioned on the tractor, it being understood that when the valve 18 is operated to apply the tractor brakes, compressed air is simultaneously conducted through conduit 20 to the relay valve 10 to effect operation of the latter to cause application of the trailer brakes. Since the invention is particularly concerned with the relay valve 10, the entire brake system with which the relay valve is utilized has not been illustrated. It will be understood that any suitable type of system may be employed, such as for example, the arrangement disclosed in the aforementioned Eaton et al. patent.

More particularly, the relay valve 10 comprises a casing 22 having an inlet chamber 24 connected with the trailer reservoir 12 by conduit 26, and an outlet chamber 28 which is in constant communication with the conduit 14. An inlet valve 30 cooperates with a seat 32 for controlling the communication between the chambers 24 and 28, and in the normal position illustrated, the inlet valve is closed by a spring 34. A stem 36, formed integrally with the valve 30, extends upwardly within a sleeve 38 carried by a valve-actuating and guide member 40, and when the latter is moved downwardly, in a manner which will appear hereinafter, the inlet valve 30 is opened to conduct fluid pressure from the trailer reservoir 12 to the trailer brakes.

The upper part of the casing 22 is formed to provide a pair of concentric ring-like portions 42 and 44 which are spaced apart to define an annular exhaust cavity 46 which communicates with the atmosphere at 48. Portion 44 constitutes an exhaust valve seat 45 and is formed as a cylinder for receiving a cylindrical guiding portion 50 of the member 40. Thus the latter member is capable of sliding movement with respect to the casing for the purpose of operating the inlet valve 30. As shown, member 40 is provided with a plurality of openings or recesses 52, see Fig. 3, for a purpose to be later described. Positioned on the portion 42 is a diaphragm supporting ring 54, which, together with the marginal portions of a diaphragm assembly 56, and a cap 58, are securely clamped to the casing 22, as by means of a series of studs 60. The cap is hollow, as illustrated, and forms with the upper surface of the diaphragm assembly, a control chamber 62 for receiving compressed air from the brake valve 18.

One of the important features of the invention resides in the construction of the diaphragm assembly 56, the arrangement being such that all vibration thereof in the sonic range, during exhaust operation of the valve is eliminated. More particularly, the diaphragm assembly 56 comprises a pair of superposed, relatively thin diaphragm sheets 64 and 66 which are of rubberlike material such as natural or synthetic rubber, and preferably these sheets are strengthened with an internal fabric reinforcement. Interposed between the sheets 64 and 66 is a relatively thin disc of a friction material 68, such as fabric, felt or cork, and this latter disc is a freely floating one, and not cemented or otherwise fixedly secured to the diaphragm sheets 64 and 66. As shown, the size of the friction disc 68 is such that when the diaphragm assembly is clamped in position, the peripheral portion of the friction disc 68 will preferably be positioned between the outer periphery of the exhaust valve seat 45 and the inner marginal portion of the cap 58, and relatively close to the latter. It will also be observed that the periphery of the friction disc slightly overlaps the inner periphery of the diaphragm ring 54. With the parts clamped in position, it will be understood that the discs 68 will be maintained in the position shown through the friction existing between its opposite surfaces and the adjacent surfaces of the diaphragm sheets 64 and 66.

Means are provided by the present invention to improve the sensitivity of the relay valve so that the pressure delivered by the valve will be a duplicate of the primary or controlling pressure throughout the entire range of operation. As shown, see Fig. 3, such means comprises a series of communicating passages 70, 72, 74 and 76 which connect the control chamber 62 with the outlet chamber 28 through a restricted choke 78 in the diaphragm structure 56. With such an arrangement it will be readily understood that the delivered pressure will always build up to a value identical with the control pressure.

In operation, upon the admission of a predetermined pressure to the control chamber 62 by operation of the brake valve 18, the central portion of the diaphragm assembly 56 will be moved downwardly to effectively seal the exhaust valve seat 45 and move the inlet valve 30 to an open position in opposition to the action of spring 34.

Fluid pressure will thereupon be conducted to the trailer brakes from the trailer reservoir by way of conduits 26, 14 and 16 and chambers 24 and 28. As the pressure continues to build up in the chamber 28, it will be understood that the inlet valve 30 will close and the relay valve will accordingly be in the lapped condition. At this point, it will also be evident that the by-pass of air from the control chamber 62 to the outlet chamber 28 by way of the restricted choke 78, will result in equalizing the delivered pressure with the supply pressure.

In the event it is now desired to increase the application of the trailer brakes, it is only necessary to increase the pressure within the control chamber 62 by further opening of the brake valve 18. As soon as this occurs, the inlet valve 30 will again be opened, through movement of the diaphragm assembly 56 and the guiding member 40, and additional pressure will be conveyed to the trailer brakes, to be followed by the lapping operation referred to above.

If it is now desired to exhaust air from the trailer brake cylinders to effect a partial release of the brakes, the brake valve 18 is operated to cause a reduction in the pressure within the control chamber 62. The higher pressure beneath the member 40 and diaphragm assembly 56 then forces the latter upwardly and away from the exhaust valve seat 45 to allow air from the brake cylinders to pass through the recesses 52 in the rim of member 40, over the annular seat 45 and to the atmospheric connection 48 by way of the exhaust chamber 46. This action will continue until the pressure has been reduced to the point where the diaphragm assembly again seals the exhaust valve seat 45 by reason of the pressure within the control chamber 62. At this point the relay valve is again in lapped condition. Complete release of pressure is achieved by merely exhausting all pressure from the control chamber 62.

During the above mentioned exhausting operation of the relay valve, it was found that without the friction disc 68, the diaphragm assembly would vibrate in such a manner as to be extremely noisy. All noise was eliminated however, as soon as the friction disc 68 was assembled as previously described. It is believed that the effect of the latter disc, is to apply a frictional force to the diaphragms 64 and 66 in the general region of the exhaust areas thereof, which effects a dampening of the diaphragms in the sonic range.

The friction disc 68 may be of any material which yields the results above set forth. Actual tests have indicated that the material is not critical and excellent results have been obtained by the use of discs of felt, cork, woven fabric and Velumoid. It has been determined however, that the diameter of the friction disc should be such that the peripheral portion is not clamped between the cap 58 and the portion 42 of the casing 22. If it were so clamped, the resulting tension of the diaphragm assembly would function as a spring load on the primary side of the relay valve and interfere with the lapping action of the valve.

There has thus been provided by the present invention, a novel and highly efficient relay valve of the type wherein a diaphragm assembly functions both as a means for controlling the inlet valve and as an exhaust valve element. The use of the relatively thin, flexible diaphragms secures a generous exhaust capacity at a relatively low fluid pressure differential, and the combination of these diaphragms with the interposed friction disc results in the complete elimination of all vibration of the diaphragm structure in the sonic range. Since the friction disc is entirely enclosed by the flexible diaphragms, it is not subjected to the action of oil or dirt during operation, and hence, will not deteriorate in service. Moreover, in view of the relatively low fluid pressure differential across the diaphragm assembly, when the valve is in operation, there will be very little tendency for the material of the friction disc to pack and thus change the frictional forces developed between such disc and the adjacent flexible diaphragms.

While the invention has been described herein, with considerable particularity, it will be readily understood by those skilled in the art that the same is not limited to the form shown, but may receive a variety of expressions without departing from the spirit of the invention.

Reference will therefore be had to the appended claims for a definition of the limits of the invention.

What is claimed is:

1. A fluid pressure operated valve having a casing provided with an inlet valve and an annular exhaust valve seat, a cap secured to said casing, a pair of superposed flexible diaphragms having their marginal portions clamped between said cap and casing, the lower diaphragm normally contacting said exhaust valve seat, a friction disc interposed between said flexible diaphragms, and means to supply fluid pressure to the space between the upper diaphragm and the cap and to exhaust fluid pressure from said space to operate the inlet valve and to allow the diaphragms to uncover the exhaust valve seat, the peripheral portion of the friction disc extending to a position between the outer periphery of the exhaust valve seat and the inner marginal portion of the cap.

2. A valve as set forth in claim 1 which comprises in addition, a diaphragm supporting ring positioned beneath the marginal portions of the diaphragms and clamped between said portions and casing by said cap, the inner periphery of said ring being substantially aligned with the peripheral portion of said friction disc.

3. In a fluid pressure operated valve, a casing provided with an annular exhaust valve seat, a diaphragm structure within the casing and normally contacting said seat, said diaphragm structure comprising a pair of superposed flexible diaphragms having a fabric disc loosely mounted therebetween, and a cap for securing the marginal portions of said flexible diaphragms to said casing, the peripheral portion of the fabric disc extending to a position between the outer periphery of the exhaust valve seat and the inner marginal portion of the cap.

4. A valve as set forth in claim 3 which comprises in addition, a diaphragm supporting ring positioned beneath the marginal portions of the diaphragm structure and clamped between said portions and casing by said cap, the inner periphery of said ring being substantially aligned with the peripheral portion of said fabric disc.

5. In a fluid pressure operated valve of the type having a casing provided with an inlet valve, an outlet chamber, an exhaust chamber, an annular exhaust seat, and a diaphragm assembly normally contacting said exhaust valve seat and having a portion movable in one direction to open the intake valve, and movable in the opposite direction to uncover the exhaust valve seat and connect the outlet chamber with the exhaust chamber, the improvement which comprises a pair of superposed flexible diaphragms of rubber-like material constituting the diaphragm assembly, a felt disc loosely mounted between said flexible diaphragms, and a cap for clamping the marginal portions of the diaphragms to the casing and for confining the felt disc between the diaphragms, the periphery of the felt disc extending to a position between the inner marginal portion of the cap and the outer peripheral portion of the exhaust valve seat.

6. A fluid pressure operated valve as set forth in claim 5 which comprises in addition, a diaphragm supporting ring positioned beneath the marginal portions of the diaphragms and clamped between said portions and casing by said cap, the inner periphery of said ring being substantially aligned with the periphery of said felt disc.

ELLERY R. FITCH.

REFERENCES CITED

The following references are of record in the file of this patent:

UNITED STATES PATENTS

| Number | Name | Date |
| --- | --- | --- |
| 412,168 | Dixon | Oct. 1, 1889 |
| 2,018,202 | Eaton | Oct. 22, 1935 |
| 2,348,740 | Jennings | May 16, 1944 |